US010884927B2

(12) United States Patent
Wang et al.

(10) Patent No.: US 10,884,927 B2
(45) Date of Patent: Jan. 5, 2021

(54) CACHE ARCHITECTURE USING WAY ID TO REDUCE NEAR MEMORY TRAFFIC IN A TWO-LEVEL MEMORY SYSTEM

(71) Applicant: Intel Corporation, Santa Clara, CA (US)

(72) Inventors: Zhe Wang, Hillsboro, OR (US); Alaa R. Alameldeen, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/927,715

(22) Filed: Mar. 21, 2018

(65) Prior Publication Data

US 2019/0042422 A1 Feb. 7, 2019

(51) Int. Cl.
*G06F 12/0811* (2016.01)
*G06F 12/0804* (2016.01)

(52) U.S. Cl.
CPC ...... *G06F 12/0811* (2013.01); *G06F 12/0804* (2013.01); *G06F 2212/1024* (2013.01); *G06F 2212/608* (2013.01)

(58) Field of Classification Search
CPC ............. G06F 12/0804; G06F 12/0811; G06F 2212/1024; G06F 2212/608
See application file for complete search history.

(56) References Cited

U.S. PATENT DOCUMENTS

| | | | | |
|---|---|---|---|---|
| 5,551,001 | A * | 8/1996 | Cohen | G06F 12/0848 711/122 |
| 6,115,794 | A * | 9/2000 | Arimilli | G06F 12/0811 711/122 |
| 2008/0104324 | A1* | 5/2008 | Raghuvanshi | G06F 12/0802 711/122 |
| 2014/0281248 | A1* | 9/2014 | Alameldeen | G06F 12/0864 711/128 |
| 2015/0186275 | A1* | 7/2015 | Moga | G06F 12/0811 711/122 |
| 2015/0278096 | A1* | 10/2015 | Rolan | G06F 12/0833 711/135 |
| 2016/0335187 | A1* | 11/2016 | Greenspan | G06F 12/0864 |

* cited by examiner

*Primary Examiner* — Aracelis Ruiz
(74) *Attorney, Agent, or Firm* — Jaffery Watson; Mendonsa & Hamilton LLP (57) ABSTRACT

One embodiment provides an apparatus. The apparatus includes last level cache circuitry and cache management circuitry. The last level cache circuitry stores cache blocks that at least partially include a subset of cache blocks stored by near memory circuitry. The near memory circuitry is configured in an n-way set associative format that references the cache blocks stored by the near memory circuitry using set identifiers and way identifiers. The cache management circuitry stores way identifiers for the cache blocks of the near memory circuitry within the cache blocks in the last level cache circuitry. Storing way identifiers in the cache blocks of the last level cache enables the cache management circuitry or memory controller circuitry to write back a cache block without reading tags in one or more ways of the near memory circuitry.

23 Claims, 6 Drawing Sheets

CACHE ARCHITECTURE USING WAY ID TO REDUCE NEAR MEMORY TRAFFIC IN A TWO-LEVEL MEMORY SYSTEM

FIELD

The present disclosure relates to memory configuration, in particular to, architecture for cache to reduce near memory traffic in a two-level memory (2LM) system.

BACKGROUND

Computing systems, such as desktop personal computers, laptops, and tablets, use at least three of types of memory to run applications and process information for users. A first type of memory is non-volatile storage (e.g., a hard drive or solid-state drive) that is used to store information, even when a computing system is powered off. A second type of memory is cache memory that is usually included in a processor chip or package. Cache memory is volatile storage (i.e., it loses data when power is removed) that is used to temporarily store data used by a computer processor while running applications and processing information for users. A third type of memory (frequently referred to as main memory) is typically a volatile memory that has performance characteristics that are in between cache and non-volatile storage. Main memory is typically slower than cache, has larger capacity than cache, is typically faster to access (read/write) than non-volatile storage, and typically has a smaller capacity than the non-volatile storage. Main memory may be used to temporarily store data from the non-volatile memory to make the data more quickly accessible to the computer processor.

In a two-level memory system, the main memory is further split into near memory and far memory. Near memory is used to cache (or temporarily) store data from far memory. Near memory functions to expand the size of cache that is usually built into a processor chip. Because each read and write access of near memory and far memory is a potential delay of other computer processor operations, reduction of read and write accesses is desirable.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Disclosed herein is a computing system configured to reduce near memory traffic in a two-level memory (2LM) system, consistent with several embodiments of the present disclosure. The computing system is configured to include a way identifier (ID) and an inclusive bit in cache lines of a last level cache (LLC), to at least partially determine whether and where a cache line is located in near memory, according to an embodiment. Determining whether and where a cache line is located in near memory facilitates writes to the near memory without performing read operations during write back operations.

A write back operation includes synchronizing data stored at two memory locations. A write back operation is performed in response to an authorized write back request. A write back request is generated when a cache block that has been modified is about to be evicted (or overwritten) in cache. The write back operation copies the modified cache block from cache to the memory location being cached. For example, if a modified cache block in third level cache is for a memory location in main memory, then a write back operation would update the memory location in main memory with the data from the modified cache block. In one embodiment, the way ID for a near memory location is stored in an LLC (e.g., third level cache) to decrease the number of read operations used to write back a modified cache block in LLC to a memory location in near memory.

A 2LM system includes two levels of main memory, a near memory and a far memory. Main memory, in general, temporarily stores information between a processor and persistent storage. In a 2LM system, the near memory is configured to operate as a cache for the far memory. The near memory may comprise volatile memory to support faster read and write access times, and the far memory may comprise volatile and/or non-volatile memory. The far memory typically includes a denser capacity of memory than the near memory, so memory mapping schemes are used to map far memory blocks into the less dense near memory blocks.

Mapping higher capacity memory locations to smaller capacity arrays of cache blocks may be performed using a variety of techniques. Some of the techniques include direct mapping, fully associative mapping, and n-way (e.g., 2-way) set associative mapping. Fully associative mapping is flexible, but typically consumes the most amount of time to locate a cache block by comparing a tag from an address to one or more tags stored in cache blocks. Direct mapping allows for faster searches of cache blocks by limiting the location of cache blocks, but direct mapping is typically inflexible. N-way set associative mapping provides a middle ground between flexibility of locating cache blocks and speed in searching.

A memory array that is organized with an n-way set associative format includes cache blocks that are indexed by sets and ways. Each set includes a number 'n' of cache blocks, and each cache block in a set is referred to as a 'way'. For a 2-way set associative format, each set includes two cache blocks that are indexed as '0' and '1'. For a 4-way set associative format, each set includes four cache blocks that are indexed as '0', '1', '2', and '3'.

Performing write back operations to near memory that is mapped with n-way set associative format has drawbacks that are at least partially resolved through the cache architecture techniques disclosed herein. Memory addresses for a cache block for n-way set associative mapped caches include a tag, an index, and an offset. The index indicates the set of a memory address of a cache block, but the memory address for a cache block does not include way ID. As a result, during traditional write back operations from an LLC to near memory, cache management circuitry or memory controller circuitry compare the address tag to the tag in each cache block (way) to identify which cache block to update. This can result in 1-8 memory reads (e.g., for 2, 4, or 8-way set associative mapping) of near memory prior to writing the data of the modified cache block to the near memory cache block.

According to embodiments of the present disclosure, read operations of near memory locations may be substantially reduced or eliminated during write back operations, by storing the way ID (for cache blocks in near memory) in the cache blocks of the LLC. By having the way ID in the cache blocks of the LLC, a write back operation may be performed by writing directly to the near memory cache block that is indexed by the address index and by the way ID stored in the modified cache block of the LLC.

As used herein, the term cache block and cache line are used interchangeably. A cache block or cache line may include a sequence of 16-128 bytes that include a validity bit, a dirty bit, a tag, data bytes, and coherence bit(s), among other information.

Figure 1:
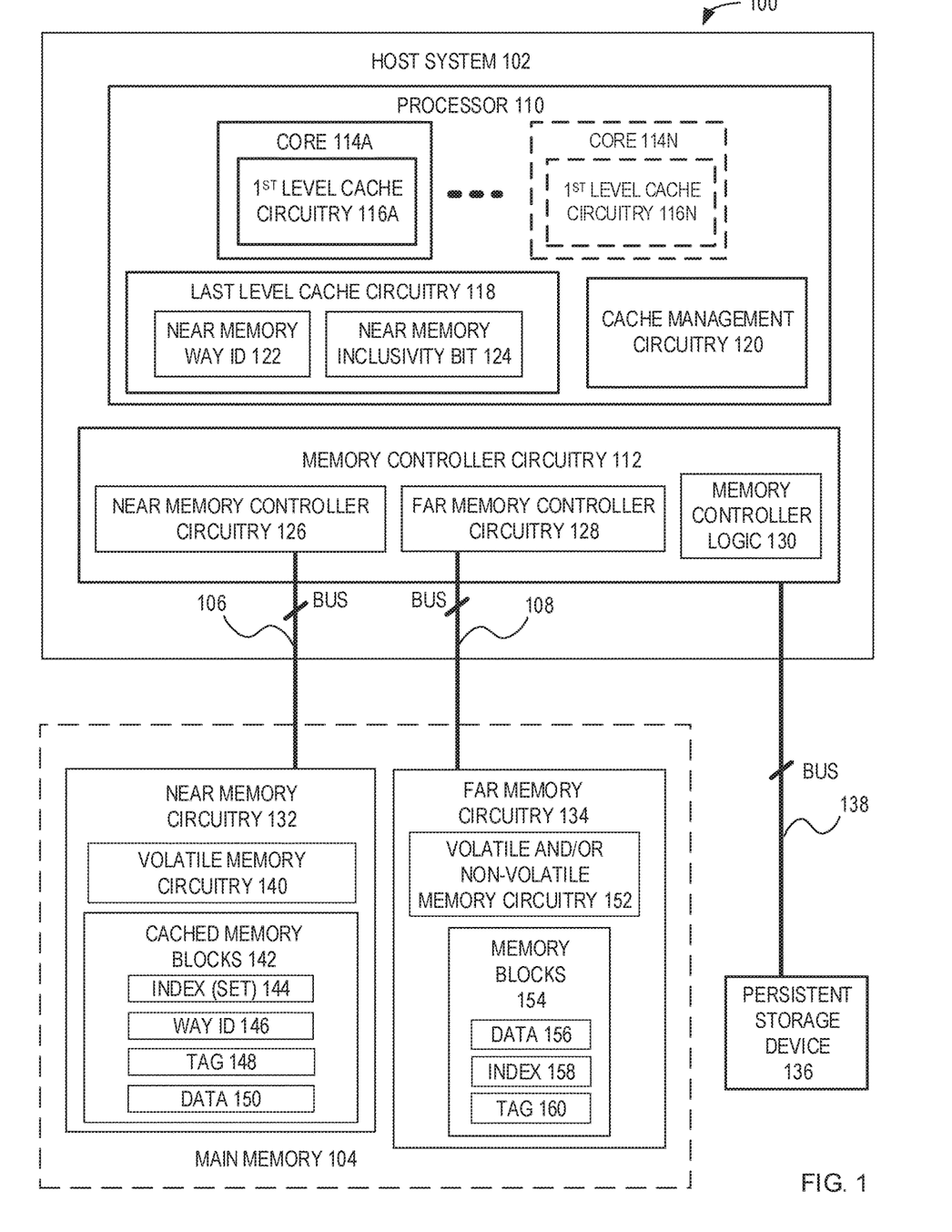
FIG. 1 illustrates a functional block diagram of a computing system using a way ID flag in cache to reduce near memory traffic in a two-level memory system, consistent with several embodiments of the present disclosure.

FIG. 1 illustrates a block diagram of a computing system 100 that is configured to reduce near memory traffic, by configuring last level cache (LLC) to use a way ID and an inclusive bit to at least partially determine whether and where a cache block is located in near memory, consistent with several embodiments of the present disclosure. The computing system 100 includes a system host 102 configured to store and retrieve cache lines to/from main memory 104 via a communication channel 106 and a communication channel 108. The communication channels 106 and 108 may be conductive buses that include traces for data, control, and/or power. The computing system 100 may include a motherboard (not shown) or other platform that may electrically and/or communicatively couple the system host 102 to the main memory 104 and that may carry the communication channels 106 and 108.

The system host 102 includes a processor 110 and memory controller circuitry 112, according to an embodiment. The system host 102 represents a processor package or a processor chip that includes a plurality of subsystems and/or subsystem circuitry, according to an embodiment. The processor 110 includes one or more cores 114A-N, one or more first level cache circuitry 116A-N, last level cache circuitry 118, and cache management circuitry 120, according to an embodiment. The one or more cores 114A-N perform computational operations on data. The one or more first level cache circuitry 116A-N and the last level cache circuitry 118 represent different levels of low-latency memory that store data to support computational operations by the one or more cores 114A-N. According to various embodiments, the processor 110 may include two, three, four, or more levels (e.g., a $1^{st}$ level, a $2^{nd}$ level, etc.) of cache. According to various embodiments, one or more levels of the cache may be unified or may be functionally segregated (e.g., some cache may be used for instructions while other cache is used for data). The last level cache circuitry 118 represents the lowest level (e.g., the $2^{nd}$, $3^{rd}$, or $4^{th}$ level, etc.) of cache and is typically configured with largest on-chip storage capacity.

The cache management circuitry 120 is configured to facilitate cache operations, such as cache fills (writing data to cache), cache eviction (over-writing cache), cache write backs, and the like. The cache management circuitry 120 causes the last level cache circuitry 118 to store/include a near memory way ID 122 and a near memory inclusive bit 124, according to one embodiment. The near memory inclusive bit 124 is an indication of whether a cache block within the last level cache circuitry 118 is also stored within the near memory circuitry 132 of the main memory 104, according to one embodiment. The near memory way ID 122 identifies which way (i.e., cache block), within an n-way associative set in the main memory 104, the cache block is to be written. Storing the near memory way ID 122 and the near memory inclusive bit 124 within the last level cache circuitry 118 enables the cache management circuitry 120 to perform write back operations of modified ("dirty") cache lines with a reduced number of read operations of the main memory 104, according to one embodiment. Some lab experimentation has indicated that approximately 95% of write back operations are to near memory circuitry 132 that includes a copy of the cache line that is to be updated (95% cache hits). Therefore, approximately 95% of write back operations between last level cache circuitry 118 and near memory circuitry 132 could benefit from a reduction of anywhere from 1-8 memory reads (depending on whether the near memory circuitry 132 is configured as 2-way, 4-way, or 8-way set associative).

The memory controller circuitry 112 is communicatively coupled to the processor 110 and is configured to control read and write access to the main memory 104, according to one embodiment. The memory controller circuitry 112 includes near memory controller circuitry 126, far memory controller circuitry 128, and memory controller logic 130 that at least partially defined the operations of the near memory controller circuitry 126 and the far memory controller circuitry 128, according to one embodiment. The near memory controller circuitry 126 is configured to provide control signals and data signals that facilitate read and/or write access operations for the near memory circuitry 132 of the main memory 104, according to one embodiment. The far memory controller circuitry 128 is configured to provide control signals and data signals to facilitate read and/or write access operations for the far memory circuitry 134, according to one embodiment.

The memory controller logic 130 enables the memory controller circuitry 112 to perform a variety of memory-related operations, according to various embodiments. The memory controller logic 130 may cause the near memory controller circuitry 126 to configure the near memory circuitry 132 as a cache for the far memory circuitry 134, according to one embodiment. The memory controller logic 130 may cause the near memory controller circuitry 126 and the far memory controller circuitry 128 to perform memory block fill functions from, for example, a persistent storage device 136 via a communication channel 138, according to one embodiment. The memory controller logic 130 may cause the memory controller circuitry 112 and/or the near memory controller circuitry 126 to communicate with the cache management circuitry 120 to read from and/or write to the near memory circuitry 132, according to one embodiment. The memory controller logic 130 may cause the memory controller circuitry 112 and/or the far memory controller circuitry 128 to communicate with the cache management circuitry 120 to read from and/or write to the far memory circuitry 134, according to one embodiment. The memory controller logic 130 may be configured to cause the near memory controller circuitry 126 to provide way ID information from the near memory circuitry 132, to be stored as the near memory way ID 122 in the last level cache circuitry 118, according to one embodiment.

The main memory 104 is coupled to the system host 102 through the communication channel 106 and the communication channel 108. Although two communication channels are illustrated and described, many more communication channels may be employed (e.g., 4, 6, etc.) to facilitate information transfer between the system host 102 and the main memory 104. The main memory 104 includes near memory circuitry 132 and far memory circuitry 134, according to one embodiment.

The near memory circuitry 132 is configured as a cache for memory blocks of the far memory circuitry 134 and for the persistent storage device 136, according to one embodiment. The near memory circuitry 132 includes volatile memory circuitry 140 that is configured to store cached memory blocks 142, according to one embodiment. The volatile memory circuitry 140 may include, but is not limited to, dynamic random-access memory ("DRAM"), static random-access memory ("SRAM"), memory devices that use chalcogenide glass, single or multi-level Phase Change Memory ("PCM"), a resistive memory, nanowire memory, ferroelectric transistor random access memory ("Fe-TRAM"), anti-ferroelectric memory, magnetoresistive random access memory ("MRAM") memory that incorporates memristor technology, resistive memory including the metal oxide base, the oxygen vacancy base and the conductive bridge Random Access Memory ("CB-RAM"), or spin transfer torque ("STT")-MRAM, a spintronic magnetic junction memory based device, a magnetic tunneling junction ("MTJ") based device, a Domain Wall ("DW") and Spin Orbit Transfer ("SOT") based device, a thyristor based memory device, or a combination of any of the above.

Figure 2:
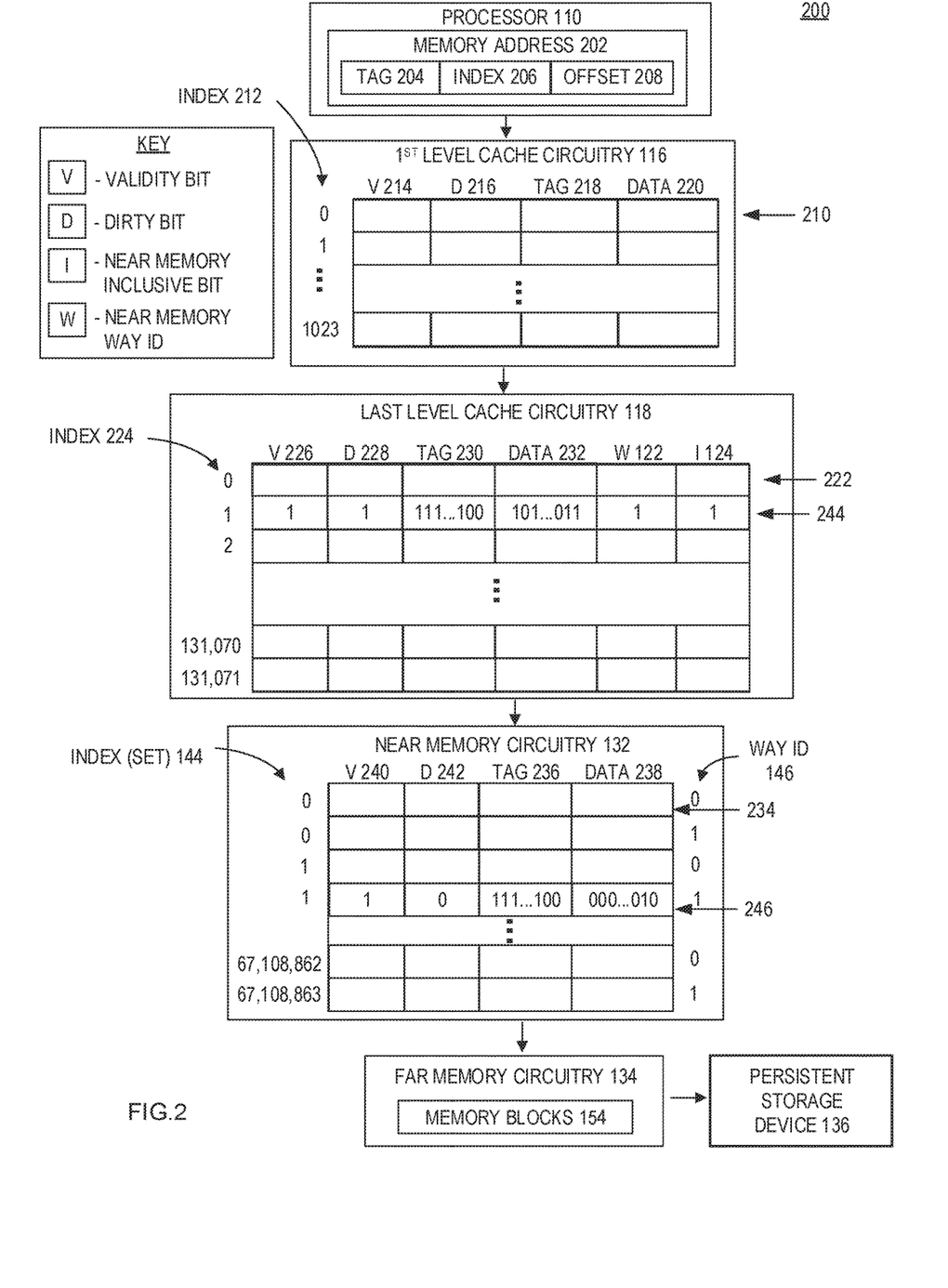
FIG. 2 is a block diagram of a cache system, according to at least one embodiment of the present disclosure.

The cached memory blocks 142 may include a subset of the memory blocks of the far memory circuitry 134. The cached memory blocks 142 are an array of cache blocks that that are organized by an index 144 (a set number) and by a way ID 146, as shown in FIG. 2, according to one embodiment. For each index 144 and way ID 146, the cached memory blocks 142 store a cache block having a tag 148 and data 150, according to one embodiment. The index 144 and the way ID 146 are properties of the cached memory blocks 142, but the cached memory blocks 142 do not store the index 144 or the way ID 146, according to an embodiment. The index 144 and/or the way ID 146 are used to reference individual cached memory blocks 142, according to an embodiment. The memory controller circuitry 112 and the cache management circuitry 120 may use the index 144 and the way ID to write to or otherwise access the cached memory blocks 142 of the near memory circuitry 132, according to an embodiment. The memory controller logic 130 may be configured to cause the near memory controller circuitry 126 and/or the memory controller circuitry 112 to provide the way ID 146 to the cache management circuitry 120 for storage in the last level cache circuitry 118 as the near memory way ID 122, according to one embodiment.

The far memory circuitry 134 includes volatile and/or non-volatile memory 152 and memory blocks 154, according to one embodiment. The volatile and/or non-volatile memory 152 may include volatile memory, such as SDRAM, or may include nonvolatile memory, such as a NAND non-volatile memory (e.g., Single-Level Cell ("SLC"), Multi-Level Cell ("MLC"), Tri-Level Cell ("TLC"), Quad-Level Cell ("QLC"), or some other NAND non-volatile memory type), NOR memory, solid-state memory (e.g., planar or three-dimensional ("3D") NAND non-volatile memory or NOR non-volatile memory), storage devices that use chalcogenide phase change material (e.g., chalcogenide glass), byte addressable non-volatile memory devices, ferroelectric memory, silicon-oxide-nitride-oxide-silicon ("SONOS") memory, polymer memory (e.g., ferroelectric polymer memory), byte addressable random accessible 3D XPoint (or crosspoint) memory, ferroelectric transistor random access memory ("Fe-TRAM"), magnetoresistive random access memory ("MRAM"), phase change memory ("PCM", "PRAM"), resistive memory, ferroelectric memory ("F-RAM", "FeRAM"), spin-transfer torque memory ("STT"), thermal assisted switching memory ("TAS"), millipede memory, floating junction gate memory ("FJG RAM"), magnetic tunnel junction ("MTJ") memory, electrochemical cells ("ECM") memory, binary oxide filament cell memory, interfacial switching memory, battery-backed RAM, ovonic memory, nanowire memory, and/or electrically erasable programmable read-only memory ("EEPROM)", according to one embodiment. Each of the memory blocks 154 include data 156 that is logically organized by an index 158 and a tag 160, according to one embodiment. Each tag 160 (with corresponding data 156) that is copied into the near memory circuitry 132 will be the same value as the tag 148 that is stored (with the data 144) in the cache memory blocks 142, according to one embodiment. The far memory circuitry 134 may have a higher latency, may have a higher density, may have a longer access time, and/or may have a lower manufacturing costs than the near memory circuitry 132.

The persistent storage device 136 is a non-volatile memory, according to one embodiment. The persistent storage device 136 may include, but is not limited to, a hard disk drive, a solid-state drive, a tape drive, and the like. The persistent storage device 136 is accessible by the system host 102. The persistent storage device 136 may be read from and/or written to with the memory controller circuitry 112 and/or with one or more other input/output components or circuitry.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

FIG. 2 illustrates a diagram a cache system 200 that shows the use of a way ID to identify a location in near memory circuitry 132 to facilitate performing a write back operation with less read access operations (or without any read access operations) of the near memory circuitry 132, according to one embodiment. The cache system 200 includes the processor 110, the first level cache circuitry 116, the last level cache circuitry 118, the near memory circuitry 132, and the far memory circuitry 134, according to one embodiment.

The processor 110 may execute one or more instructions that rely on a memory address 202, according to one embodiment. The memory address 202 may include a tag 204, an index 206, and an offset 208 for referencing an instruction or data in a cache line, according to one embodiment. When attempting to access information associated with the memory address 202, the processor 110 may sequentially attempt to locate the information in first level cache circuitry 116, intermediate levels of cache circuitry (not shown), the last level cache circuitry 118, the near memory circuitry 132, the far memory circuitry 134, and then the persistent storage device 136, until the information is found.

The first level cache circuitry 116 includes a number of cache blocks 210, which are referenced by an index 212, according to one embodiment. Each of the number of cache blocks 210 include, but are not limited to, a validity bit 214, a dirty bit 216, a tag 218, and data 220, according to one embodiment. The validity bit 214 is an indication of whether or not the information in a particular cache line is valid. The dirty bit 216 can be an indication of whether or not information in a particular cache line has been modified to differ from the information that is stored in the near memory circuitry 132 or the far memory circuitry 134, according to one embodiment. In the illustrated example, the first level cache circuitry 116 is 64 kibibytes and includes 64 bytes per cache line and 1,024 cache lines.

The last level cache circuitry 118 includes a number of cache blocks 222, which are referenced by an index 224, according to one embodiment. Each of the number of cache blocks 222 include, but are not limited to, a validity bit 226, a dirty bit 228, a tag 230, data 232, a near memory way ID 122, and a near memory inclusive bit 124, according to one embodiment. The validity bit 226 is an indication of whether or not the information in a particular cache block is valid. The dirty bit 228 can be an indication of whether or not information and a particular cache block has been modified to differ from the information that is stored in the near memory circuitry 132 or the far memory circuitry 134, according to one embodiment. The near memory way ID 122 is a reference to one of the way IDs 146 that references cache block in the near memory circuitry 132. The near memory way ID 122 may include a number of bits to represent the way ID 146 of the near memory circuitry 132. For example, if the near memory circuitry 132 is organized in a 2-way set associative format, then the near memory way ID 122 may be 1-bit. If the near memory circuitry 132 is organized in a 4-way set associative format, then the near memory way ID 122 may be 2-bits. If the near memory circuitry 132 is organized in an 8-way set associative format, then the near memory way ID 122 may be 3-bits, and so forth. In the illustrated example, the last level cache circuitry 118 is 8 mebibytes and includes 64 bytes per cache line and 131,072 cache lines.

The near memory circuitry 132 includes a number of cache blocks 234 that are referenced by the index (or set number) 144 and by the way ID 146, according to one embodiment. The index 144 and the way ID 146 are properties of the cache blocks 234 and are not stored in the cache blocks 234 of the near memory circuitry 132, according to an embodiment. The index 144 and the way ID 146 are used to reference particular ones of the cache blocks 234, according to an embodiment. In the simplified example of the near memory circuitry 132, the number of cache blocks 234 are organized in a 2-way set associative format, such that the way ID 146 is either '0' or '1'. Each of the number of cache blocks 234 include, but are not limited to, a tag 236 and data 238. Each of the number of cache blocks 234 may also include a validity bit 240 and a dirty bit 242, according to one embodiment. The validity bit 240 is an indication of whether or not the information in a particular cache block is valid. The dirty bit 242 can be an indication of whether or not information and a particular cache block has been modified to differ from the information that is stored in the far memory circuitry 134, according to one embodiment. In the illustrated example, the near memory circuitry is 8 gibibytes and includes 64 bytes per cache line, 2 ways per set, and 67,108,864 sets.

Although only the near memory circuitry 132 is described and illustrated as mapped in n-way set associative format, in practice one or more cache levels may also be n-way set associatively mapped, according to various implementations.

To illustrate how a way ID and inclusive bit may be used to reduce near memory read operations, consider the following example illustrated in the cache system 200. The last level cache circuitry 118 includes a modified (dirty) cache block 244, as indicated by a '1' in the field for the dirty bit 228. Since the dirty bit 228 is '1', the data 232 (indicated by 101 . . . 011) has been changed from the corresponding cache block 246 in the near memory circuitry 132. Assuming, for the example, that the cache block 244 (having an index of 1) had been mapped to the cache block 246 (in set 1), cache management circuitry or memory controller circuitry would have to have read way 0 of set 1 and (since it is not a match) way 1 of set 1 to determine that the tag 230 matched the tag 236. Since one of the cache blocks included a tag match, then the cache management circuitry or the memory controller circuitry could have performed a write back operation to the near memory circuitry 132. However, because the cache block 244 includes the inclusive bit 124 (which indicates that the cache block 244 exists in near memory circuitry 132) and includes the way ID 122 (which indicates that the tag 230 matches the tag 236 in way '1' of the near memory circuitry 132), neither the cache management circuitry nor the memory controller need first verify (using tag comparison) which cache line to write back in the near memory circuitry 132. Instead, set 1 and way 1 of cache block 246 may be addressed and directly written to. As a result, one or two read operations (for the 2-way set associative example) may be saved from this example write back operation.

Figure 3:
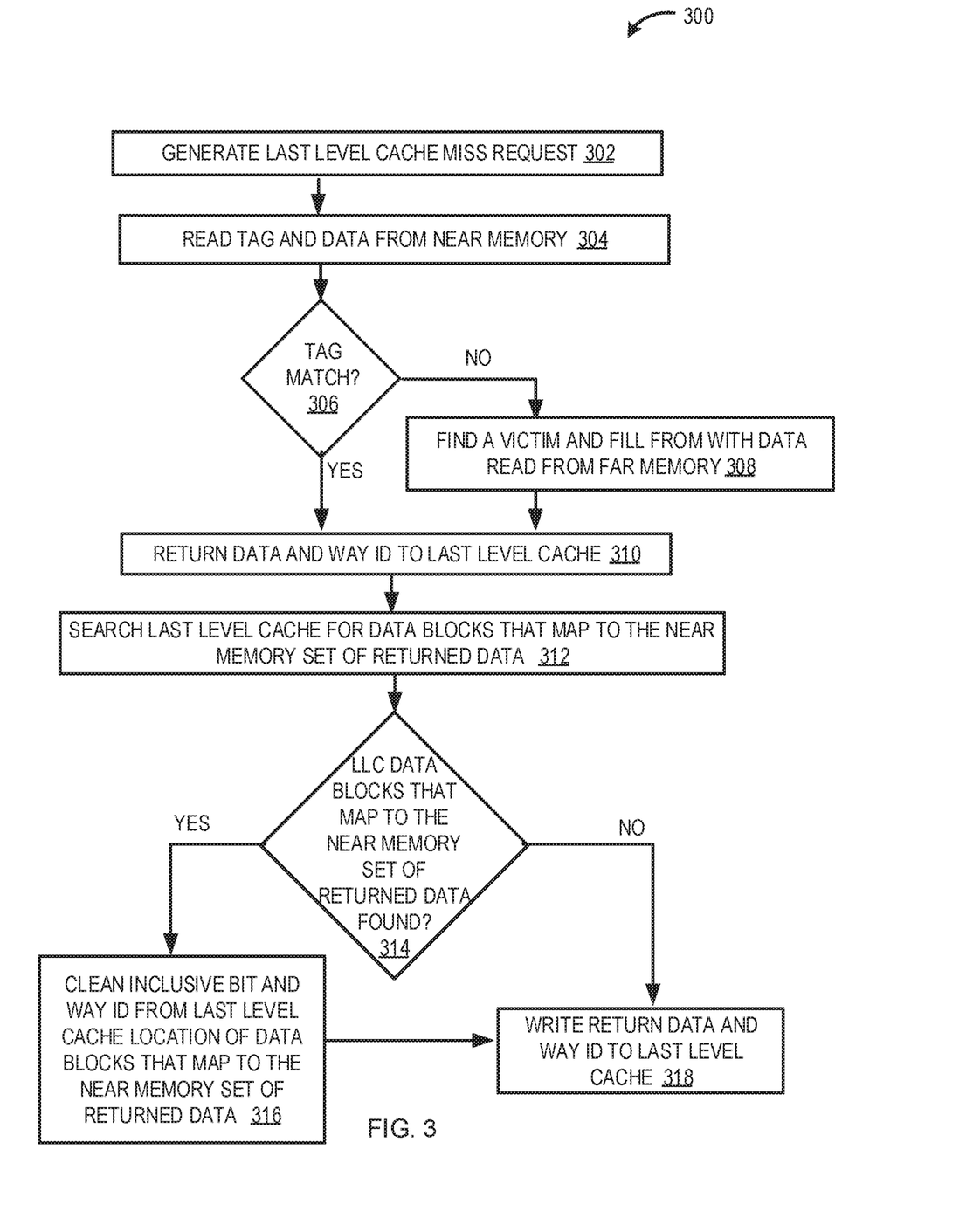
FIG. 3 is a flowchart of a process for performing a cache miss request, according to at least one embodiment of the present disclosure.

FIG. 3 is a flowchart of a process 300 for performing a cache miss request, according to at least one embodiment of the present disclosure.

At operation 302, the process 300 includes generating a last level cache miss request, according to one embodiment. This may occur when a processor is unable to find information for a particular memory address (which includes a tag, index, and offset) in any higher-level caches (e.g., first level cache) nor in the last level cache.

At operation 304, the process 300 includes reading a tag and data from near memory, according to one embodiment. The tag and data read from near memory are matches to the information sought with a particular memory address.

At operation 306, the process 300 includes determining if the near memory tag matches the address tag, according to one embodiment. If the tag does not match, operation 306 proceeds to operation 308, according to one embodiment. If the tag matches, operation 306 proceeds to operation 310, according to one embodiment.

At operation 308, the process 300 includes finding a victim and filling a cache block in near memory with data read from far memory, according to one embodiment. A victim is a cache block to be written over with more relevant information.

At operation 310, the process 300 includes returning data and way ID to the last level cache, according to one embodiment.

At operation 312, the process 300 includes searching last level cache for data blocks that map to the near memory set of returned data, according to one embodiment.

At operation 314, the process 300 includes determining if the last level cache data blocks that map to the near memory set of returned data have been found, according to one embodiment. If the last level cache data blocks are found, operation 314 proceeds to operation 316, according to one embodiment. If the last level cache data blocks are not found, operation 314 proceeds to operation 318, according to one embodiment.

At operation 316, the process 300 includes clean inclusive bit and way id from last level cache location of data blocks that map to the near memory set of returned data, according to one embodiment. Operation 316 proceeds to operation 318, according to one embodiment.

At operation 318, the process 300 includes writing the return data and way ID to last level cache, according to one embodiment. In an embodiment, the return data and way ID are written to the location in last level cache that stored the old data blocks. In an embodiment, the return data and way ID are written to a cache block in last level cache based on a cache management policy, without regard to the location of the old data blocks.

Figure 4:
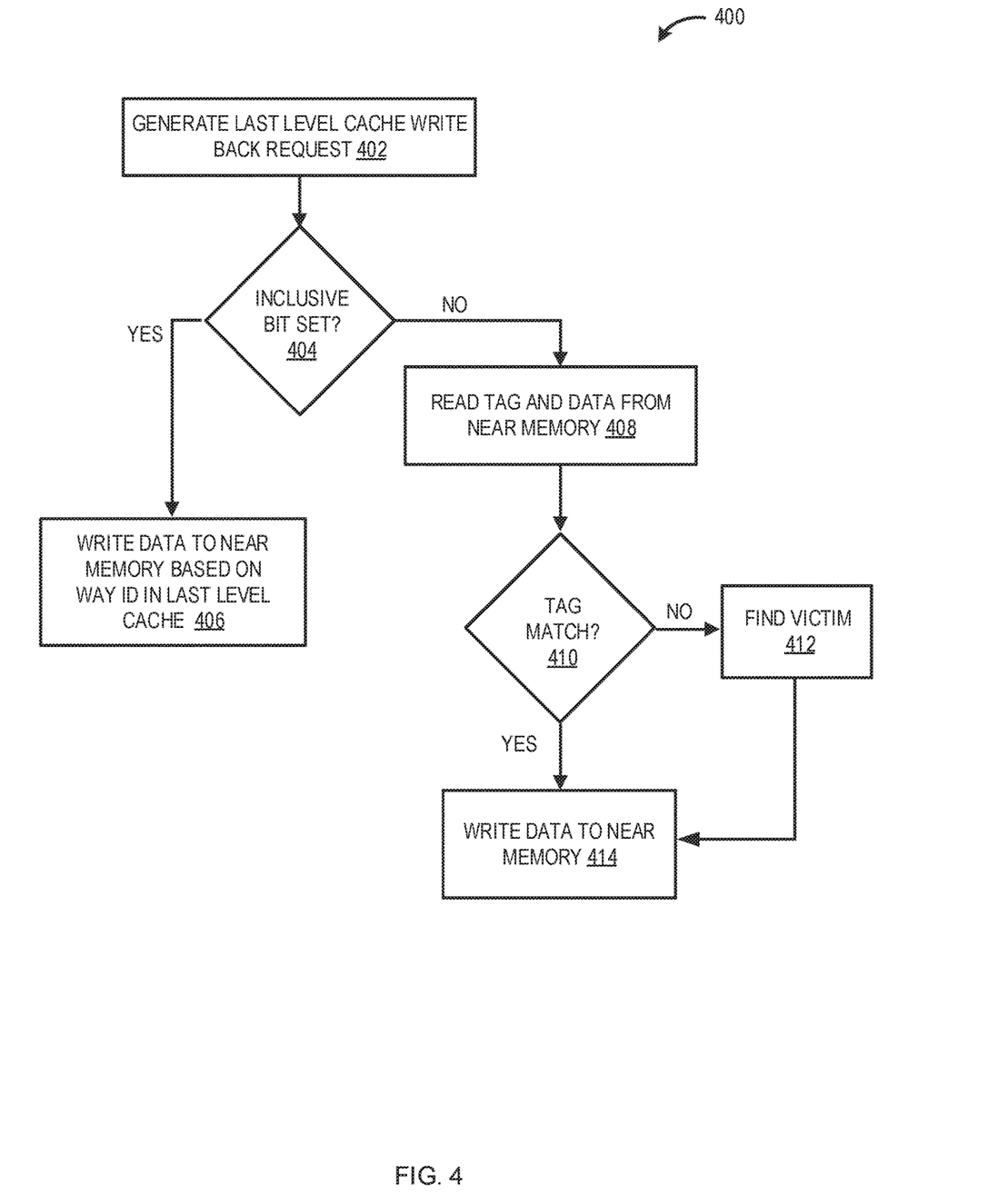
FIG. 4 is a flowchart of a process for performing a cache write back request, according to at least one embodiment of the present disclosure.

FIG. 4 is a flowchart of a process 400 for performing a cache write back request, according to at least one embodiment of the present disclosure.

At operation 402, the process 400 includes generating a last level cache write back request, according to one embodiment. A write back request initiates a write back operation to copy a modified cache block from last level cache to near memory.

At operation 404, the process 400 includes determining if the inclusive bit is set, according to one embodiment. If the inclusive bit is set, operation 404 proceeds to operation 406, according to one embodiment. If the inclusive bit is not set, operation 404 proceeds to operation 408, according to one embodiment.

At operation 406, the process 400 includes writing data to near memory based on a way ID in the last level cache, according to one embodiment.

At operation 408, the process 400 includes reading a tag and data from near memory, according to one embodiment.

Operation 410, the process 400 includes determining if the read tag matches the address tag, according to one embodiment. If the read tag does not match the address tag, operation 410 proceeds to operation 412, according to one embodiment. If the read tag matches the address tag, operation 410 proceeds to operation 414, according to one embodiment.

At operation 412, the process 400 includes finding a victim, according to one embodiment.

At operation 414, the process 400 includes writing data to near memory, according to one embodiment.

Figure 5:
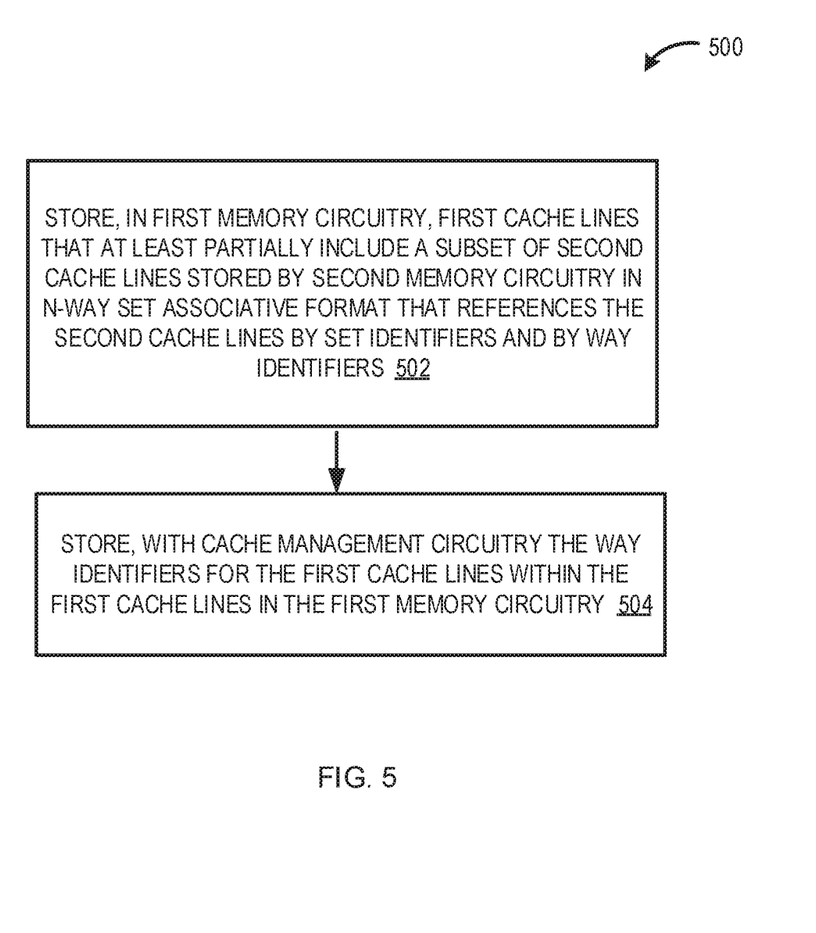
FIG. 5 is a flowchart of a process for performing a cache write back request, according to at least one embodiment of the present disclosure.

FIG. 5 is a flowchart of a process 500 for performing a cache write back request according to at least one embodiment of the present disclosure.

At operation 502, the process 500 includes storing, in first memory circuitry, first cache lines that at least partially include a subset of second cache lines stored by second memory circuitry in n-way set associative format that references the second cache lines by set identifiers and by way identifiers, according to one embodiment. First memory circuitry is last level cache circuitry, according to one embodiment. Second cache memory circuitry is near memory circuitry, according to one embodiment. Second cache memory circuitry is volatile main memory, according to one embodiment. The set identifiers are indexes that are included in a memory address, along with a tag, and an offset, according to one embodiment.

At operation 504, the process includes storing, with cache management circuitry the way identifiers for the first cache lines within the first cache lines in the first memory circuitry, according to one embodiment. The way identifiers (ID) may be stored with inclusive bits in the first cache lines, to facilitate direct write back operations into near memory circuitry, according to one embodiment.

Figure 6:
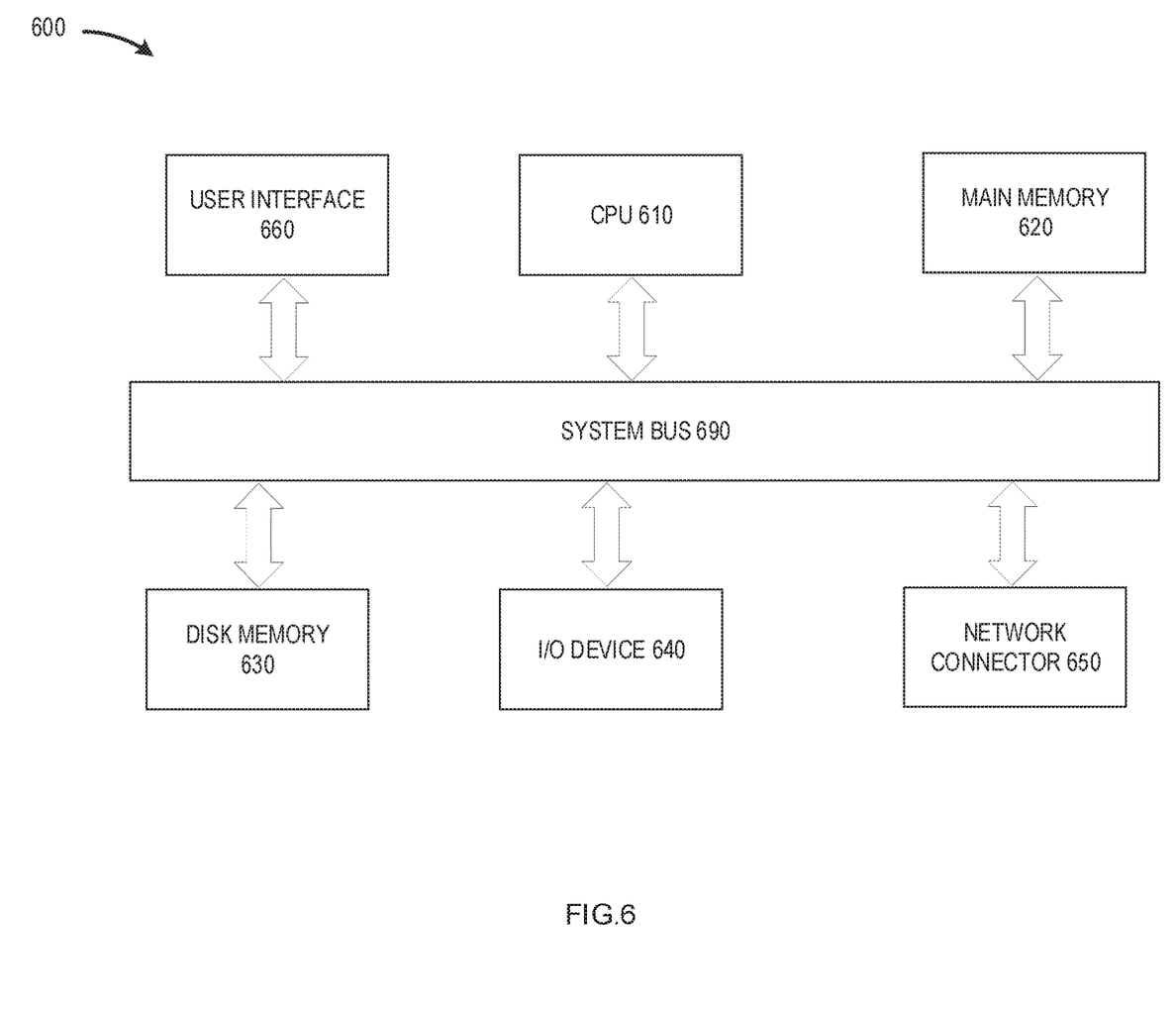
FIG. 6 is a block diagram illustrating a computing system, according to at least one embodiment of the present disclosure.

FIG. 6 is an illustrative diagram of a computing system 600 that may use one or more of the disclosed techniques for reducing near memory (e.g., main memory) read access operations, consistent with embodiments of the present disclosure. The computing system 600 may be included in, for example, a desktop computer, a laptop computer, a netbook, a notebook computer, a personal digital assistant (PDA), a server, a workstation, a cellular telephone, a mobile computing device, an Internet appliance or any other type of computing device.

The computing system 600 may include central processing unit (CPU) 610 to exchange data, via system bus 690, with user interface 660, main memory 620, disk memory 630, I/O device 640 and network connector 650.

The main memory 620 comprises any two-level memory (2LM) embodiment described above, which include near memory circuitry and far memory circuitry. The near memory circuitry may include, for example, synchronous dynamic random-access memory (SDRAM), dynamic random access memory (DRAM), RAMBUS dynamic random access memory (RDRAM), and/or any other type of random access memory device. The far memory circuitry may include random access memory, non-volatile memory (e.g., solid state memory, phase change memory, 3D XPoint™, or any combination thereof.

The disk memory 630 may be integrated with the far memory circuitry of the main memory 620, or may be included in a separate device. The disk memory 630 may comprise, for example, a solid state disk (SSD) drive, flash memory, phase change memory (PCM), read-only memory (ROM), electrically erasable programmable read-only memory (EEPROM), or any other type of non-volatile memory device.

The network connector 650 may comprise, for example, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any other form of wireless communication protocol.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor 110 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog-Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, a device, an apparatus, or a system related to cache architecture using way ID to reduce near memory traffic in a two-level memory system, as discussed below.

Example 1

According to this example, there is provided an apparatus. The apparatus includes first memory circuitry to store first cache blocks that at least partially include a subset of second cache blocks stored by second memory circuitry in n-way set associative format that references the second cache blocks by set identifiers and by way identifiers. The apparatus includes cache management circuitry to store the way identifiers for the subset of second cache blocks within the first cache blocks in the first memory circuitry.

Example 2

This example includes the elements of example 1, wherein the cache management circuitry to store inclusive bits within the first cache blocks, each of the inclusive bits to indicate whether a corresponding cache block is copied into the second memory circuitry.

Example 3

This example includes the elements of example 1, wherein the cache management circuitry to write a modified cache block, of the first cache blocks, over one of the subset of second cache blocks referenced by a way identifier stored within the modified cache block and referenced by a set identifier of a memory address, in response to a write back request.

Example 4

This example includes the elements of example 3, wherein the modified cache block to include a first tag and the one of the second cache blocks to include a second tag, wherein the cache management circuitry to use the way identifier stored within the modified cache block and the set identifier of the memory address to skip comparing the first tag to the second tag prior to writing the modified cache block over the one of the second cache blocks.

Example 5

This example includes the elements of example 1, wherein the first memory circuitry is a last level cache circuitry in a multi-level cache configuration in a processor package.

Example 6

This example includes the elements of example 1, wherein the second memory circuitry is main memory that at least partially includes volatile memory circuitry.

Example 7

This example includes the elements of example 6, wherein the main memory includes near memory circuitry and far memory circuitry, wherein the second memory circuitry is the near memory circuitry.

Example 8

This example includes the elements of example 7, wherein the near memory circuitry is volatile memory circuitry and the far memory circuitry is non-volatile memory circuitry, wherein memory capacity of the far memory circuitry is larger than memory capacity of the near memory circuitry.

Example 9

This example includes the elements of example 7, wherein the near memory circuitry is configured as a cache for the far memory circuitry.

Example 10

This example includes the elements of example 1, further including memory controller circuitry to provide a new way identifier to the cache management circuitry, in response to filling one of the second cache blocks with new cache block information in the second memory circuitry, and in response to a cache miss at the second memory circuitry.

Example 11

This example includes the elements of example 1, wherein the second memory circuitry is organized in one of 2-way set associative format, 4-way set associative format, or 8-way set associative format.

Example 12

This example includes the elements of example 1, wherein each of the first cache blocks includes a valid bit, a dirty bit, a tag, data bytes, a coherence bit, and one of the way identifiers.

Example 13

According to this example, there is provided a method. The method includes storing, in first memory circuitry, first cache blocks that at least partially include a subset of second cache blocks stored by second memory circuitry in n-way set associative format that references the second cache blocks by set identifiers and by way identifiers. The method includes storing, with cache management circuitry, the way identifiers for the subset of second cache blocks within the first cache blocks in the first memory circuitry.

Example 14

This example includes the elements of example 13, further comprising storing inclusive bits within the first cache blocks, each of the inclusive bits to indicate whether a corresponding cache block is copied into the second memory circuitry.

Example 15

This example includes the elements of example 13, further comprising writing a dirty cache block, of the first cache blocks, over one of the second cache blocks referenced by a way identifier stored within the dirty cache block and referenced by a set identifier of a memory address, in response to a write back request.

Example 16

This example includes the elements of example 15, wherein the dirty cache block includes a first tag and the one of the second cache blocks to include a second tag, wherein the cache management circuitry to use the set identifier and the way identifier to skip comparing the first tag to the second tag prior to writing the dirty cache block over the one of the second cache blocks.

Example 17

This example includes the elements of example 13, wherein the first memory circuitry is a last level cache circuitry in a multi-level cache configuration in a processor package.

Example 18

This example includes the elements of example 13, wherein the second memory circuitry is main memory that includes near memory circuitry and far memory circuitry, wherein the second memory circuitry is the near memory circuitry.

Example 19

This example includes the elements of example 18, wherein the near memory circuitry is configured as cache for the far memory circuitry.

Example 20

This example includes the elements of example 13, further comprising providing a new way identifier to the cache management circuitry, in response to filling one of the second cache blocks with new cache block information in the second memory circuitry, and in response to a cache miss at the second memory circuitry.

Example 21

According to this example, there is provided a system. The system includes a processor. The system includes first memory circuitry to store first cache blocks that at least partially include a subset of second cache blocks stored by second memory circuitry in n-way set associative format that references the second cache blocks by set identifiers and by way identifiers. The system includes cache management circuitry to store the way identifiers for the subset of second cache blocks within the first cache blocks in the first memory circuitry.

Example 22

This example includes the elements of example 21, wherein the cache management circuitry to store inclusive bits within the first cache blocks, each of the inclusive bits to indicate whether a corresponding cache block is copied into the second memory circuitry.

Example 23

This example includes the elements of example 21, wherein the cache management circuitry to write a dirty cache block, of the first cache blocks, over one of the second cache blocks referenced by a way identifier stored within the dirty cache block and referenced by a set identifier of a memory address, in response to a write back request.

Example 24

This example includes the elements of example 23, wherein the dirty cache block to include a first tag and the one of the second cache blocks to include a second tag, wherein the cache management circuitry to use the way identifier stored within the dirty cache block and the set identifier of the memory address to skip comparing the first tag to the second tag prior to writing the dirty cache block over the one of the second cache blocks.

Example 25

This example includes the elements of example 21, wherein the second memory circuitry is near memory circuitry, wherein the near memory circuitry is volatile memory circuitry.

Example 26

This example includes the elements of example 21, further comprising memory controller circuitry to provide a new way identifier to the cache management circuitry, in response to filling one of the second cache blocks with new cache block information in the second memory circuitry, and in response to a cache miss at the second memory circuitry.

Example 27

According to this example, there is provided a computer readable device storing instructions that, if executed by one or more processors, performs the method of any one of examples 13 to 20.

Example 28

According to this example, there is provided a device comprising means to perform the method of any one of examples 13 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
   last level cache (LLC) memory circuitry to store first cache blocks that at least partially include a subset of second cache blocks; the second cache blocks stored on main system memory circuitry in n-way set associative format that references the second cache blocks by set identifiers and by way identifiers; and
   cache management circuitry to store the way identifiers for the subset of second cache blocks within the first cache blocks in the LLC memory circuitry; wherein the cache management circuitry is to store a near memory inclusive bit within each of the first cache blocks, the inclusive bit to indicate whether a corresponding cache block within the LLC memory circuitry is also stored in one of the second cache blocks in the main system memory circuitry.

2. The apparatus of claim 1, wherein the cache management circuitry is configured to write a modified cache block, of the first cache blocks, over one of the subset of second cache blocks referenced by a way identifier stored within the modified cache block and referenced by a set identifier of a memory address, in response to a write back request.

3. The apparatus of claim 2, wherein the modified cache block is configured to include a first tag and the one of the second cache blocks to include a second tag, wherein the cache management circuitry to use the way identifier stored within the modified cache block and the set identifier of the memory address to skip comparing the first tag to the second tag prior to writing the modified cache block over the one of the second cache blocks.

4. The apparatus of claim 1, wherein the cache memory circuitry is a last level cache circuitry in a multi-level cache configuration in a processor package.

5. The apparatus of claim 1, wherein the main system memory circuitry is part of a main memory that at least partially includes volatile memory circuitry.

6. The apparatus of claim 5, wherein the main memory includes near memory circuitry and far memory circuitry, wherein the main system memory circuitry is the near memory circuitry.

7. The apparatus of claim 6, wherein the near memory circuitry is volatile memory circuitry and the far memory circuitry is non-volatile memory circuitry, wherein memory capacity of the far memory circuitry is larger than memory capacity of the near memory circuitry.

8. The apparatus of claim 6, wherein the near memory circuitry is configured as a cache for the far memory circuitry.

9. The apparatus of claim 1, further comprising:
   memory controller circuitry configured to provide a new way identifier to the cache management circuitry, in response to filling one of the second cache blocks with new cache block information in the main system memory circuitry, and in response to a cache miss at the main system memory circuitry.

10. The apparatus of claim 1, wherein the main system memory circuitry is organized in one of 2-way set associative format, 4-way set associative format, or 8-way set associative format.

11. The apparatus of claim 1, wherein each of the first cache blocks includes a valid bit, a dirty bit, a tag, data bytes, a coherence bit, and one of the way identifiers.

12. A method comprising:
    storing, in last level cache (LLC) memory circuitry, first cache blocks that at least partially include a subset of second cache blocks; the second cache blocks stored on main system memory circuitry in n-way set associative format that references the second cache blocks by set identifiers and by way identifiers; and
    storing, with cache management circuitry, the way identifiers for the subset of second cache blocks within the first cache blocks in the LLC memory circuitry;
    storing, with the cache management circuitry, a near memory inclusive bit within each of the first cache blocks, the near memory inclusive bit to indicate whether a corresponding cache block within the LLC memory circuitry is also stored in one of the second cache blocks in the main system memory circuitry.

13. The method of claim 12, further comprising:
    writing a dirty cache block, of the first cache blocks, over one of the second cache blocks referenced by a way identifier stored within the dirty cache block and referenced by a set identifier of a memory address, in response to a write back request.

14. The method of claim 13, wherein the dirty cache block includes a first tag and the one of the second cache blocks to include a second tag, wherein the cache management circuitry to use the set identifier and the way identifier to skip comparing the first tag to the second tag prior to writing the dirty cache block over the one of the second cache blocks.

15. The method of claim 12, wherein the cache memory circuitry is a last level cache circuitry in a multi-level cache configuration in a processor package.

16. The method of claim 12, wherein the main system memory circuitry is main memory that includes near memory circuitry and far memory circuitry, wherein the main system memory circuitry is the near memory circuitry.

17. The method of claim 16, wherein the near memory circuitry is configured as cache for the far memory circuitry.

18. The method of claim 12, further comprising:
providing a new way identifier to the cache management circuitry, in response to filling one of the second cache blocks with new cache block information in the main system memory circuitry, and in response to a cache miss at the main system memory circuitry.

19. A system comprising:
at least one processor core;
last level cache (LLC) memory circuitry to store first cache blocks that at least partially include a subset of second cache blocks; the second cache blocks stored on main system memory circuitry in n-way set associative format that references the second cache blocks by set identifiers and by way identifiers; and
cache management circuitry to store the way identifiers for the subset of second cache blocks within the first cache blocks in the LLC memory circuitry; wherein the cache management circuitry is to store a near memory inclusive bit within each of the first cache blocks, the near memory inclusive bit to indicate whether a corresponding cache block within the LLC memory circuitry is also stored in one of the second cache blocks in the main system memory circuitry.

20. The system of claim 19, wherein the at least one processor core, the cache memory circuitry and the cache management circuitry are included in a processor package, the system further comprising:
main memory communicatively coupled to the processor package through at least one conductive bus, wherein the main memory includes the main system memory circuitry.

21. The system of claim 20, wherein the processor package includes memory controller circuitry to provide a new way identifier to the cache management circuitry, in response to filling one of the second cache blocks with new cache block information in the main system memory circuitry, and in response to a cache miss at the main system memory circuitry.

22. The system of claim 20, wherein the main system memory circuitry is near memory circuitry, wherein the near memory circuitry is volatile memory circuitry.

23. The system of claim 20, wherein the main memory includes far memory circuitry, wherein the far memory circuitry at least partially includes non-volatile memory circuitry.

* * * * *